Figure 1:
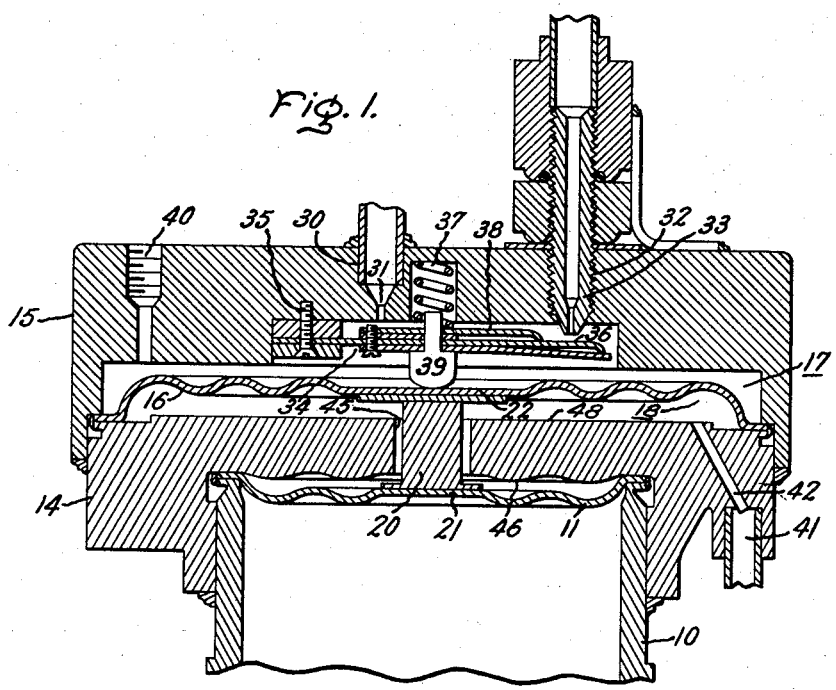

April 28, 1959   A. J. BIALOUS ET AL   2,883,995
PRESSURE TRANSMITTER FOR LIQUID METAL SYSTEMS
Filed Sept. 21, 1954

Inventors:
Adolf J. Bialous,
Eugene R. Astley,
by Claude A. Matt
Their Attorney.

United States Patent Office 2,883,995
Patented Apr. 28, 1959

2,883,995

PRESSURE TRANSMITTER FOR LIQUID METAL SYSTEMS

Adolf J. Bialous and Eugene Roy Astley, Schenectady, N.Y., assignors to General Electric Company, a corporation of New York Application September 21, 1954, Serial No. 457,496

1 Claim. (Cl. 137—85)

This invention relates to a pressure transmitter and more particularly to a pressure transmitter for liquid metal systems.

The advent of nuclear reactors for power generation has stimulated the study of such fluids as lithium, sodium, potassium, sodium-potassium, and lead-bismuth alloys for use as high temperature heat extractors. These liquid metals offer attractive advantages as heat transfer fluids in high temperature systems. In such liquid metal systems, pressure measurements are very necessary for efficient operation. These measurements are necessary to inform the operator of system pressure before loading and to warn him of system plugs or improper valve closure and of conditions leading to pump cavitation during operation. However, pressure measuring instruments suitable for these systems have not been readily available.

Some of the desirable characteristics of a useful pressure transmitter for liquid metal systems are that it be mass-spectrometer leak tight, and that it be able to withstand operation in corrosive fluids, such as liquid sodium and sodium-potassium alloy, and additionally that it be long lasting, reliable, and of a simple design. The pressure transmitter should remain leak tight after exposure to pressures considerably in excess of normal system pressures. If used in nuclear reactor colant systems, the pressure transmitter should not be adversely affected by nuclear radiation nor be made of neutron absorbing materials.

Thus, one of the objects of this invention is to provide a simple, reliable pressure transmitter for liquid metal systems which has the desirable characteristics mentioned above.

Another object of the invention is to provide a pressure transmitter for liquid metal systems in which there may be amplification or attentuation of the force caused by the pressure on the system side of the transmitter.

Another object is to provide a pressure transmitter for liquid metal systems in which the liquid metal system is protected from contamination in the event of rupture of the diaphragm exposed to the system.

Another object is to provide such a pressure transmitter in which the pressure sensing element is protected from full expansion and deformation or possible rupture due to overpressures encountered in the system.

Briefly stated in accordance with one aspect of this invention, there is provided a pressure transmitter comprising a pair of diaphragms connected together in spaced relation, one of the diaphragms being exposed to pressure in a liquid metal system and the other diaphragm being exposed to a force-balance means for imparting a force thereto equal to and opposite from the force imparted as a result of the system pressure. The cross sectional areas of the two diaphragms may be different so that amplification or attenuation of the force caused by the system pressure may be obtained. The space between the two diaphragms may be vented to atmospheric pressure to prevent errors in transmission caused by a buildup of pressure between the diaphragms due to temperature rise. The space also insures that rupture of one of the diaphragms will not contaminate the liquid metal system with pneumatic fluid or other fluids used in the force-balance means. This venting also permits calibration of the instrument from a remote point without removing it from the system. Backing members are provided to protect the diaphragms from over-expansion or rupture due to overpressures.

A better understanding of the invention and its additional objects and advantages may be had from perusal of the following description taken in connection with the accompanying sheet of drawing, and the scope of the invention will be pointed out in the appended claim.

Figure 2:
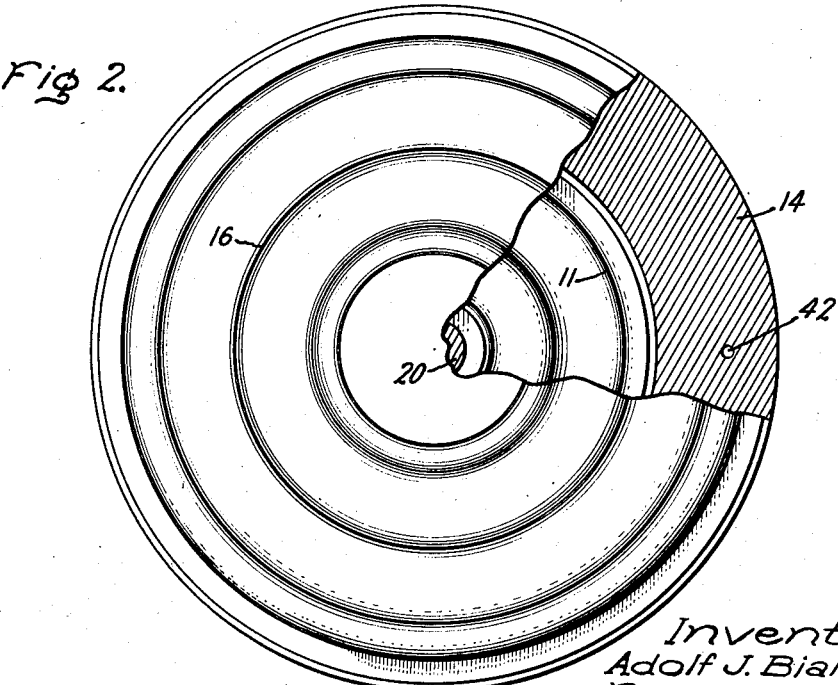

In the drawing, Fig. 1 shows a cross-section of a pressure transmitter illustrating the principles of this invention. Fig. 2 is a plan view of Fig. 1 with the housing cap removed and the backing member partially broken away to show diaphragms.

Referring more particularly to the drawing, the system side of the pressure transmitter of this invention comprises a short tube 10 having one end open for plug-free communication with a liquid metal system. The other end of the tube 10 is covered and sealed with a thin metal diaphragm 11, preferably edge-welded to the tube to provide a leak-proof construction which is mandatory in liquid metal systems. The diaphragm is, of course, the pressure sensing element of the transmitter.

A housing is provided having a hollow portion therein and is secured and sealed to the tube 10 so as to surround the tube and the diaphragm 11. This housing comprises a backing member 14 and a cup-shaped cap 15 secured thereto as by welding.

A second metal diaphragm 16 is secured and sealed at its outer edges to the housing so as to divide the hollow portion into an upper chamber 17 and a lower chamber 18. Means are provided for rigidly connecting the first and second diaphragms in spaced apart relation, and in the illustrated embodiment, this means is in the form of a rod 20 welded to the central disk portions 21 and 22 of the respective diaphragms.

Force balance means are provided for imparting a force to the second diaphragm equal and opposite to the force imparted thereto as a result of the system pressure through the interconnection between the diaphragms. In its preferred form, this force balance means comprises a port 30 in the housing cap 15 with a restricting orifice 31 adapted to admit compressed air into the upper chamber 17, and an exhaust port 32 having a nozzle 33 for exhausting the air. A flapper spring arrangement 34 is secured within the cap 15 as by cap screws 35 and the flapper spring 36 is maintained in mechanical contact with the second diaphragm by a coil spring 37 acting against an arm 38 and in turn against a stud 39. The flapper spring 36, being mechanically linked with the pressure sensing diaphragm 11, acts against the exhaust nozzle 33 as a control valve. For any given system pressure, it assumes a position with respect to the exhaust nozzle which causes the force due to pneumatic pressure on top of the second diaphragm 16 to equal the force caused by the system pressure on the bottom of the first diaphragm 11.

A gage port 40 is provided in the cap 15 which is in communication with the upper chamber 17 and is adapted to receive a pressure indicating device or a gage. Any conventional pressure gage can be connected to this gage port 40 and although isolated from the liquid metal system, it will read the true system pressure.

A vent port 41, communicating through a bore 42 with the lower chamber 18, is provided in the backing member 14 for the purpose of venting the lower chamber 18 to atmospheric pressure. By thus maintaining a lower pressure within the space between the two diaphragms than there is on the opposite faces of these diaphragms, contamination of the liquid metal system either by a buildup of pressure within the lower chamber 18 or by leakage of air from the upper chamber 17 is prevented. This port also permits calibration of the instrument from a remote point without removing the instrument from the system. For example, by admission of a fluid to the lower chamber 18 at any of a plurality of predetermined pressures, a plurality of predetermined forces may be impressed against the bottom of diaphragm 16. The resulting forces acting against diaphragms 16 are the product of the pressure supplied to lower chamber 18 and the difference in area of diaphragms 11 and 16. In the manner already discussed, the force balance means provide for a change in pressure in upper chamber 17 creating an additional force acting upon the top of the diaphragm 16, which force is equal and opposite to that impressed against the bottom of diaphragm 16. The resulting pressures in upper chamber 17 are then communicated through the gage port 40 for calibration purposes. Remote calibration is necessary when the transmitter is used in areas of nuclear radiation.

The backing member 14 comprises an annular plate having a bore 45 therethrough to accommodate the interconnecting rod 20. The lower surface 46 serves as a backing for the system diaphragm 11 and prevents over expansion and deformation and possible rupture of the diaphragm when the system subjects it to overpressures. For this purpose, the surface 46 may have corrugations corresponding to the corrugations of the diaphragm 11. The upper surface 48 of the backing member 14 serves as a backing for the second diaphragm 16 and prevents over expansion and deformation and possible rupture of this second diaphragm in the event of overpressure. Such overpressure may be caused by failure of the regulator of the pneumatic supply means connected to the orifice 31 or by failure of the control action of the flapper spring 36 in exhausting the chamber 17. It will be appreciated that when two diaphragms of the same size are used, the upper surface 48 of the backing member may also have corrugations.

A pressure transmitter of the type described herein and having a mechanical amplification of approximately 3 to 1 has been constructed and used sucessfully in liquid metal systems having pressures up to 100 lbs./sq. inch. The operation of this transmitter satisfactorily fulfilled the objects of this invention. An accuracy of ±3 percent was obtained for system pressures up to 100 p.s.i.g when the transmitter was subjected to the following conditions:

(1) Temperatures from 300 to 1000 degrees F. continuously and temperatures up to 1100 degrees F. for one-half hour.

(2) Temporary overpressure up to 200 p.s.i.g.

(3) Temporary evacuation of the system at any operating temperature.

(4) Severe conditions of shock and vibration.

The selection of metals used in the manufacture of the transmitter was a compromise in which consideration was given to the operating temperature, corrosion resistance, spring properties, weldability, thermal expansion properties and friction. Inconel X was chosen as the diaphragm material since it resists the corrosive action of hot liquid sodium, can be heat treated to obtain optimum spring properties, has high creep strength, and will maintain these spring properties at the high temperatures used in this application. A diaphragm thickness of 0.010 inch was found to provide a sensitivity of 0.030 p.s.i. or better for all ranges constructed. The tube body 10 is made of Inconel since it is more readily available than Inconel X, welds readily to it, and has similar thermal expansion properties. Inconel is also used for the backing member 14 and the pneumatic cap 15 for similar reasons. Inconel, Inconel X, and No. 316 stainless steel are used in the flapper spring and nozzle to obtain optimum wearing, spring, and thermal expansion properties. As a result of careful selection of metals, the maximum change in spacing between the flapper spring 36 and the nozzle 33 due to thermal expansion, was limited to 0.001 inch over a temperature range from 80 to 1000 degrees F. This movement can be reduced to 0.0005 inch by the application of either tungsten or molybdenum to the design. A very exacting and constant spring rate is required of the coil spring 37 which presses the flapper spring arrangement against the diaphragm. A coil spring made of Iconel X wire, when properly heat treated was found to possess the required spring properties. It perfoms satisfactorily over the entire operating pressure and temperature range of the transmitter.

The choice of Inconel X as diaphragm and spring material permits the forming of these components in their fully annealed (solution heat treated) condition which allows full draw to be obtained in forming. Spring properties and maximum creep strength can then be fully recovered by subsequent heat treatment (age hardening). In this manner, it is possible to obtain full draw in the forming of the diaphragm without sacrificing spring properties. Since rapid quenching is required by the heat treating process which imparts optimum spring properties to Inconel X, this treatment must be applied after the diaphragm 11 is welded to the transmitter tube body. Further assembly after this point increases the mass of the transmitter to a point which makes rapid quenching impossible. Since good spring properties of the system side diaphragm are extremely important, a considerable amount of care is taken to prevent the transmitter reaching temperatures which would jeopardize the age hardened condition of the diaphragm as a result of subsequent welding operations. Various chill blocks, liquids and flowing gases are used in conjunction with the most suited welding procedure to control the transmitter temperature during welding operations.

While a particular embodiment of the invention has been illustrated and described, modifications thereof will readily occur to those skilled in the art. It should be understood therefore that the invention is not limited to the particular arrangement disclosed but that the appended claim is intended to cover all modifications which do not depart from the true spirit and scope of the invention.

What is claimed as new and desired to be secured by United States Letters Patent is:

A pressure transmitter for use with liquid metal systems comprising a tube having one end open for direct communication with a system, a first diaphragm covering and sealed at its outer edges to the other end of the tube, a housing having a hollow portion therein secured and sealed to the tube and surrounding the end of the tube and the first diaphragm, a second diaphragm secured and sealed at its outer edges to the housing and dividing the hollow portion into an upper chamber defined by said hollow portion and said second diaphragm and a lower chamber sealed from said upper chamber and defined by said first and second diaphragms, the cross-sectional area of said first diaphragm being different from that of said second diaphragm, means providing communication between said lower chamber and the exterior of said housing for normally maintaining said lower chamber at a lower pressure than the upper chamber pressure, said means providing for admission of a fluid at any of a plurality of predetermined pressures to said lower chamber from a source remote from said pressure transmitter whereby the pressure transmitter may be remotely and directly calibrated, means rigidly connecting the central portions of the first and second diaphragms and maintaining them in spaced relation, force balance means including a fluid admission port and a fluid exhaust port communicating with said upper chamber and a lever type exhaust control valve coupled to said diaphragms for controlling the upper chamber pressure, said force balance means imparting a force to said second diaphragm equal to and opposite from the force imparted thereto as a result of system pressure, and a port in communication with said upper chamber adapted to communicate with a pressure indicating device.

References Cited in the file of this patent

UNITED STATES PATENTS

| | | | |
|---|---|---|---|
| Re. 21,804 | Gorrie | May 20, 1941 |
| 151,367 | Eils | May 26, 1874 |
| 187,053 | Shaw | Feb. 6, 1877 |
| 2,308,923 | Hartley | Jan. 19, 1943 |
| 2,356,970 | Brockett | Aug. 29, 1944 |
| 2,405,979 | Rosenberger | Aug. 20, 1946 |
| 2,441,405 | Fitch | May 11, 1948 |
| 2,455,184 | Markson | Nov. 30, 1948 |
| 2,539,892 | Cook | Jan. 30, 1951 |
| 2,584,455 | Hughes | Feb. 5, 1952 |
| 2,649,714 | Griffith | Aug. 25, 1953 |
| 2,659,381 | Seljos | Nov. 17, 1953 |
| 2,737,016 | Day | Mar. 6, 1956 |
| 2,753,885 | White | July 10, 1956 |